United States Patent
Pham et al.

(10) Patent No.: US 12,067,065 B2
(45) Date of Patent: *Aug. 20, 2024

(54) SYSTEM AND METHOD FOR INTEGRATING CONTENT INTO WEBPAGES

(71) Applicant: Capital One Services, LLC, McLean, VA (US)

(72) Inventors: Vincent Pham, Seattle, WA (US); Reza Farivar, Champaign, IL (US); Austin Walters, Savoy, IL (US); Jeremy Goodsitt, Champaign, IL (US); Galen Rafferty, Mahomet, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,678

(22) Filed: May 16, 2023

(65) Prior Publication Data
US 2023/0289392 A1 Sep. 14, 2023

Related U.S. Application Data

(63) Continuation of application No. 17/324,217, filed on May 19, 2021, now Pat. No. 11,681,765, which is a
(Continued)

(51) Int. Cl.
*G06F 16/9535* (2019.01)
*G06F 16/955* (2019.01)
(Continued)

(52) U.S. Cl.
CPC ...... *G06F 16/9535* (2019.01); *G06F 16/9566* (2019.01); *G06F 16/972* (2019.01);
(Continued)

(58) Field of Classification Search
None
See application file for complete search history.

(56) References Cited

U.S. PATENT DOCUMENTS

| 10,303,754 B1 * | 5/2019 | Kumar | G06F 9/451 |
| 2013/0073382 A1 * | 3/2013 | Henkin | G06F 16/955 |
| | | | 707/706 |

(Continued)

*Primary Examiner* — Thu N Nguyen
(74) *Attorney, Agent, or Firm* — Foley & Lardner LLP

(57) ABSTRACT

In certain embodiments, reference identifiers may be generated and embedded into a website's content. A request for a reference identifier to be embedded into first content on a first website may be obtained based on a user accessing the first website. Based on the request, interaction data related to the first website may be retrieved indicating that a prior user interacted with text on the first website and subsequently accessed a second website. A reference identifier related to the second website may be caused to be embedded into the text on the first website based on: (i) the second website comprising second content related to the text, (ii) the prior user interacting with the text on the first website, and (iii) the prior user accessing the second website after interacting with the first content on the first website.

15 Claims, 9 Drawing Sheets

Related U.S. Application Data continuation of application No. 16/574,720, filed on Sep. 18, 2019, now Pat. No. 11,061,980.

(51) Int. Cl.
  *G06F 16/958* (2019.01)
  *G06N 20/00* (2019.01)
  *H04L 67/02* (2022.01)
  *H04L 67/306* (2022.01)

(52) U.S. Cl.
  CPC .............. *G06N 20/00* (2019.01); *H04L 67/02* (2013.01); *H04L 67/306* (2013.01)

(56) References Cited

U.S. PATENT DOCUMENTS

| | | | |
|---|---|---|---|
| 2018/0246983 A1* | 8/2018 | Rathod | G06F 16/972 |
| 2019/0236137 A1* | 8/2019 | Hesketh | G06F 16/9535 |

* cited by examiner

SYSTEM AND METHOD FOR INTEGRATING CONTENT INTO WEBPAGES

CROSS-REFERENCE TO RELATED APPLICATIONS

This application is a continuation of U.S. patent application Ser. No. 17/324,217, filed on May 19, 2021, which is a continuation of U.S. patent application Ser. No. 16/574,720, filed on Sep. 18, 2019. The disclosure of which applications is hereby incorporated by reference in its entirety.

FIELD OF THE INVENTION

The invention relates to integrating content into one or more online resources, including, for example, embedding hyperlinks into webpage content based on prior user interactions.

BACKGROUND OF THE INVENTION

Website creators generate websites by writing a document in a computer readable programming language. Users accessing the website via client devices are provided with the document, which is rendered by the client device's web browser. The website is fixed in the sense that the website's creator, or other authorized individuals, are able to modify the document. The users are locked out from editing the document, personalizing it based on each user's specific preferences and history.

These and other drawbacks exist.

SUMMARY OF THE INVENTION

Aspects of the invention relate to methods, apparatuses, media, and/or systems for integrating content into one or more online resources.

In some embodiments, a first request for a reference identifier (e.g., URL or other reference identifier) to be embedded into first content on a first website may be obtained based on a first user accessing the first website. Based on the first request, first interaction data related to the first website may be retrieved. The first interaction data may indicate that a prior user interacted with text on the first website and subsequently accessed a second website. A first reference identifier related to the second website may be caused to be embedded into the text on the first website based on: (i) the second website comprising second content related to the text, (ii) the prior user interacting with the text on the first website, and (iii) the prior user accessing the second website after interacting with the first content on the first website.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
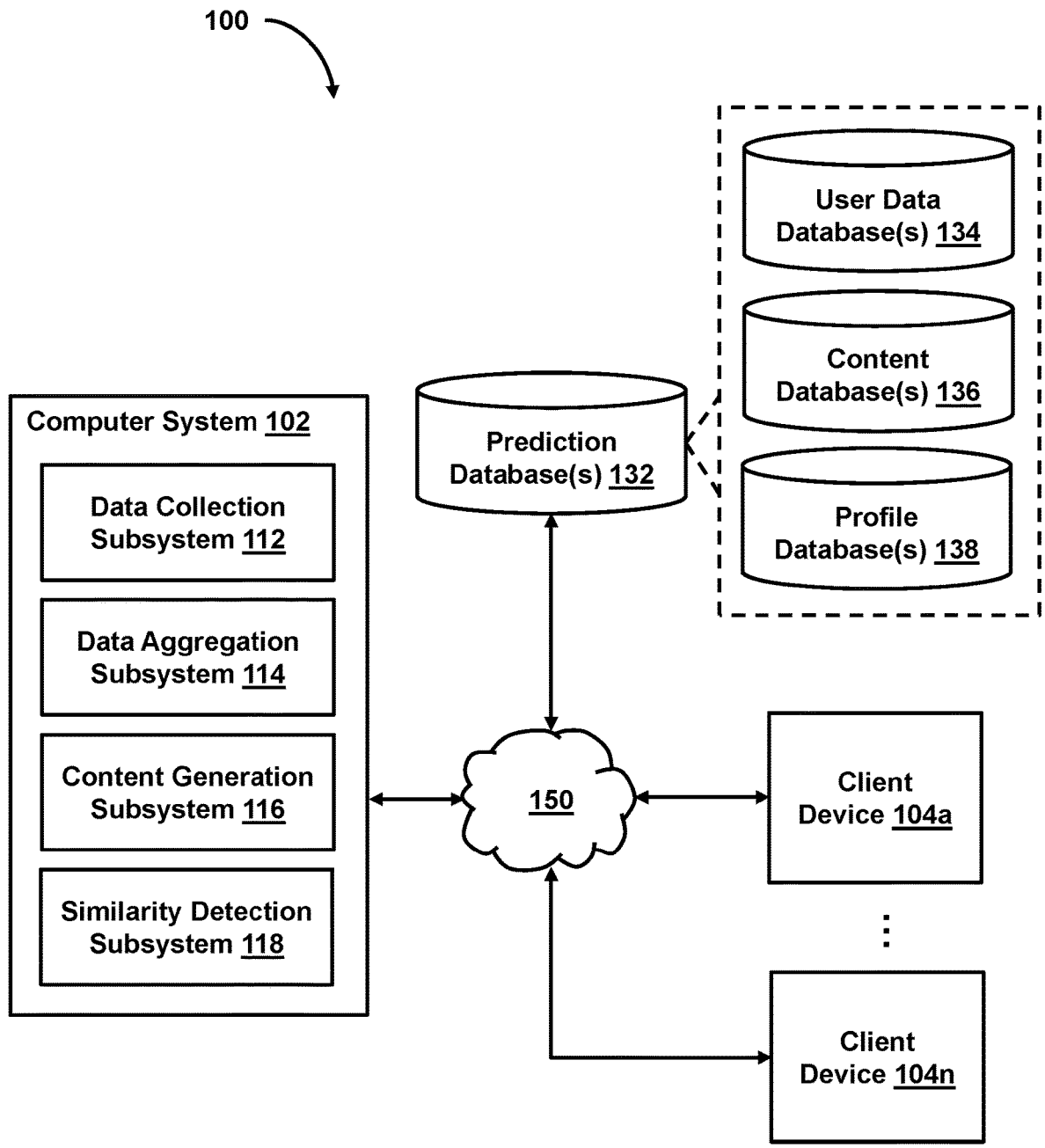
FIG. 1 show a system for embedding content into a webpage, in accordance with one or more embodiments.

FIG. 1 shows a system 100 for embedding content into a webpage, in accordance with one or more embodiments. As shown in FIG. 1, system 100 may include computer system 102, client device 104 (or client devices 104a-104n), or other components. Computer system 102 may include data collection subsystem 112, data aggregation subsystem 114, content generation subsystem 116, similarity detection subsystem 118, and/or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should also be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may be configured to determine content to be embedded into a document (e.g., webpage, or other online resources, etc.) and may also be configured to cause the content to be embedded onto the webpage. As an example, system 100 may determine a uniform resource locator (URL) that is relevant to a word, phrase, or content item rendered by a webpage, generate a hyperlink including the URL, and embed the hyperlink including the URL into the webpage. In some embodiments, the content is identified based on actions previously performed by one or more users with respect to the webpage, the content, or both. For example, system 100 may determine that users that accessed the webpage typically accessed the content (or a URL whereby the content is accessible from) afterword.

In some embodiments, a website's content may be generated, selected, formatted, etc., by an author. The author may determine what content to include on the webpage, where that content should be located when rendered by a client device, (e.g., client device 104), and what actions may be taken by users upon interacting with the content. A webpage may be a rendering by a web browser of a document written in a computer programmable language. Various computer programmable languages may be used by an author to create websites including, for example, hypertext markup language (HTML), cascading style sheets (CSS), and JavaScript. Typically the author writes the document in the computer programmable language or languages of their choice, indicating where each content item is to be displayed upon rendering by a client device, and the options available to an end user when accessing the webpage. For example, the author may indicate, via the document, which words, phrases, or images include hyperlinks directed to other (potentially related) websites.

After the author has developed the document, users operating respective client devices may access a URL of the website via a web browser. The website's server may retrieve the document from a database and may provide the document to the web browser, which may render the content as the author has specified. However, the document is not editable by users, let alone customizable for each user that accesses the corresponding website. Unless the developer explicitly indicates, when writing the document, users may be left to search for additional content related to the content currently being accessed. This may result in users leaving a website's domain, reducing their overall activity statistics of the website and decreasing opportunities to add revenue via advertising on the website, as well as diminishing a user's general experience with the website.

In some embodiments, a website may be customized to include hyperlinks, other content, or both, related to aspects of the information displayed by the website. The hyperlinks and/or content may be determined based on prior interactions of a user with whom the website is to be displayed for. In some embodiments, the hyperlinks and/or content may be determined based on prior interactions of one or more other users that previously interacted with the website, one or more other users that previously interacted with a similar website, and/or one or more other users having similar user profiles with respect to the user. Some embodiments may include causing the hyperlinks and/or content to be embedded into the website. Thus, the website may be configured to include a hyperlink and/or content even if the author of the website's document has not.

In some embodiments, a website's author or administrator may authorize the website to include hyperlinks and/or content. For example, the website's author may indicate in the web document that the website is allowed to include hyperlinks based on user interactions. As another example, a request may be sent to the website's author to enable the website to include hyperlinks based on user interactions. In addition to the website being granted permission to allow hyperlinks (or more generally, content) to be embedded into the website, a corresponding user may authorize user interactions tracking via their web browser. In some embodiments, the user interactions tracking may be performed using a web browser extension or add-on that allows user-based customization of the web browser to be performed. In some embodiments, the user interactions may be tracked by client device 104, computer system 102, or other components of system 100.

Some embodiments include detecting that a word or phrase included within text displayed by a website has been highlighted by a user operating a respective client device, (e.g., client device 104). For example, the user may highlight the word or phrase using a cursor controlled by a computer mouse. As another example, the user may highlight the word or phrase using a finger or stylus. As still another example, the user may speak an invocation that, upon processing by speech recognition functionality, causes the word or phrase to be highlighted. In some embodiments, the word or phrase that is highlighted may be copied, (e.g., stored in temporary memory on their user device). For example, the highlighted word or phrase may be stored to a clipboard, which is a buffer that is provided by a computing device's operating system for performing short-term memory storage. After being copied, the word or phrase may be provided as an input to a search engine. For instance, the user may access another instance of the web browser, sometimes referred to as a "tab," and may access a search engine's website. In some embodiments, the web browser may include a search engine directly in the web browser's interface, allowing the user to input search terms for the search. For example, the web browser may include a text box that a user may input search terms into and that causes a search to be performed using a search engine in response to submission of those search terms.

After the search engine performs the search, search results may be provided to the user and displayed via the web browsers. The search results may include user-selectable links to websites that are determined by the search engine to be relevant to the search terms. For example, the search terms "World War 1" may produce search results including websites directed to information related to World War 1, websites where materials related to World War 1, (e.g., books, videos, etc.), may be purchased, and the like. In some embodiments, the user may select one of the links, redirecting the web browser to a corresponding website, and causing the content included within that website to be rendered by the web browser.

In some embodiments, the user interactions—highlighting/selecting a word or phrase, copying the selected word or phrase, providing the copied word or phrase to a search engine as an input for a search, and accessing one of the search results returned by the search engine—may be monitored and tracked by the web browser. The web browser may collect data associated with the user interactions and aggregated for a number of users to determine trends in activity. For example, based on the user interactions, a determination may be made that after a user highlights a particular word included within a first website's text, the user typically accesses a second website. Based on the user interactions, one or more hyperlinks may be generated and caused to be embedded into the first website such that, if the user revisits the site, the hyperlinks may be presented to the user. For example, the hyperlinks may be embedded within the selected text. If the user hovers their cursor, finger, or stylus proximate the word or phrase, the hyperlinks may be presented to the user.

In some embodiments, the hyperlinks may be dynamically included within a website based on prior user interactions where the prior user interactions may include actions performed by other users differing from the user with whom the website is to be presented. The hyperlinks may be determined by identifying the most frequently accessed websites by users after highlighting/selecting a particular word or phrase included within the text of the website. For instance, after highlighting a particular word on a first website, a number of other users may access a second website (e.g., by inputting the word into a search engine, receiving search results based on a search of the word, and accessing a search result directed to the second website). If the number of users exceeds a threshold number of users, then the second website may be identified as being related to the word. In some embodiments, a hyperlink directed to the URL of the second website may be generated and embedded into the text of the first website, such as at a location of the selected word. Thus, if the user, while viewing the contents of the first website, interacts with the selected word, the generated hyperlink may be presented to the user. This may allow the user to directly access relevant content with respect to the particular words or phrases included within a web site's content without having to perform an independent search for relevant content.

Subsystems 112-118

Data collection subsystem 112 may be configured to obtain data including user interactions with a website. In some embodiments, a user may access and view websites via a web browser operating on a respective client device 104. As mentioned above, the web browsers may include web browser extensions that facilitate the collection of data including user interactions, which may also be referred to herein interchangeably as "user interaction data." The web browsers may store the data in memory on client devices 104, and may provide the data to computer system 102, (e.g., data collection subsystem 112), via network(s) 150. In some embodiments, data collection subsystem 112 may be obtain the data periodically, in response to a user input, or in response to a request for client device 104 to provide the data.

In some embodiments, the user interactions may indicate each user that accessed the website as well as each action performed by the user while accessing the website. For example, users may be identified by a username, an email address, a telephone number, a device identifier (e.g., a MAC address, IP address, serial number), or other identifiers. The actions performed by the user may include selecting (e.g., highlighting) and copying one or more words, phrases, characters, images, videos, etc., providing the selected words, phrases, characters, images, videos, etc., to a search engine as an input for a search, and obtaining a selection of a result from the search. In some embodiments, data collection subsystem 112 may be configured to provide, via network(s) 150, the obtained data to user data database 134 to be stored. User data database 134 may organize the data with respect to a user identifier, timestamp with which each action occurred, or both.

Figure 2A:
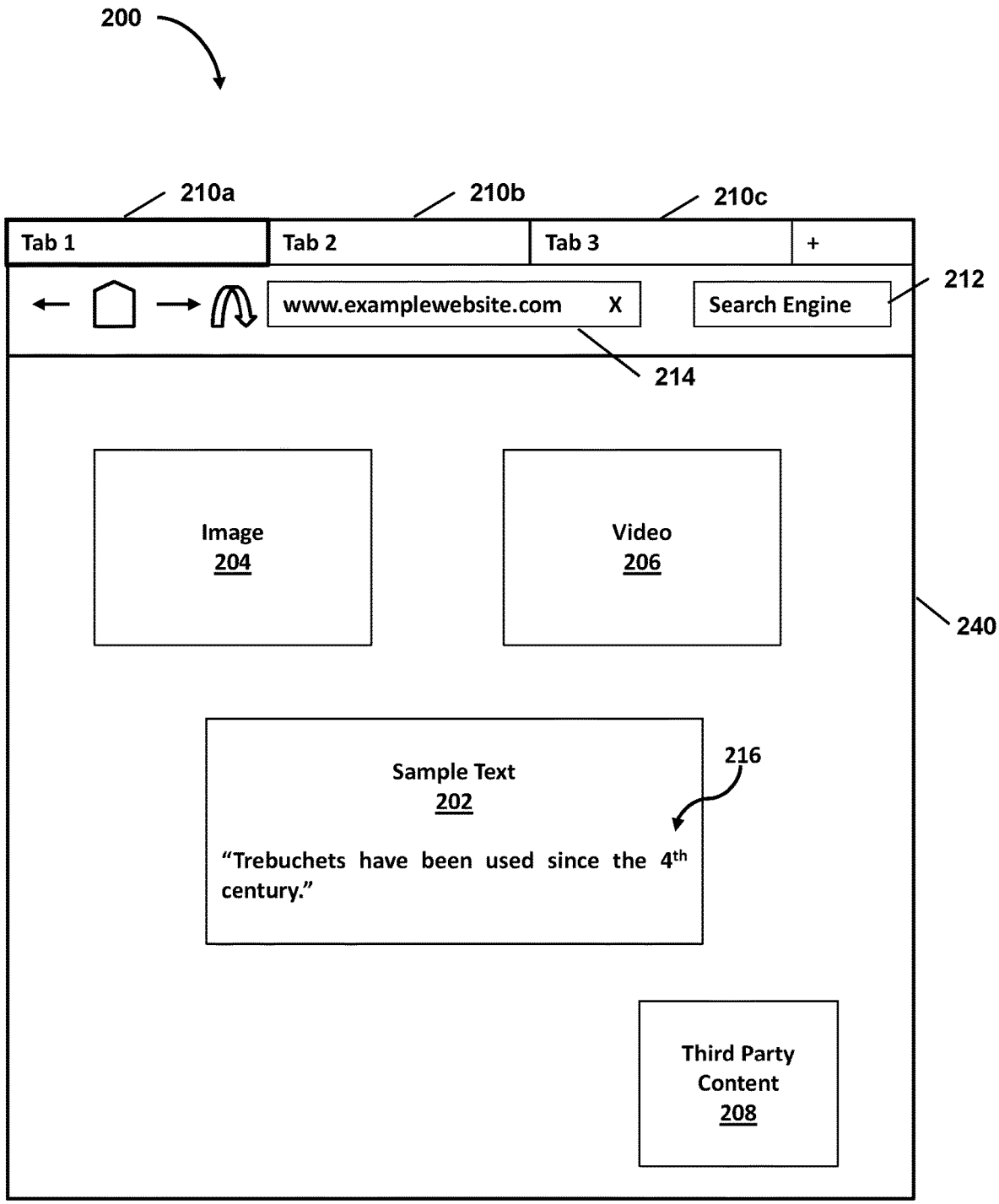
FIGS. 2A-2C show highlighting text on a webpage and providing the highlighted text as an input for a search, in accordance with one or more embodiments.
Figure 2B:
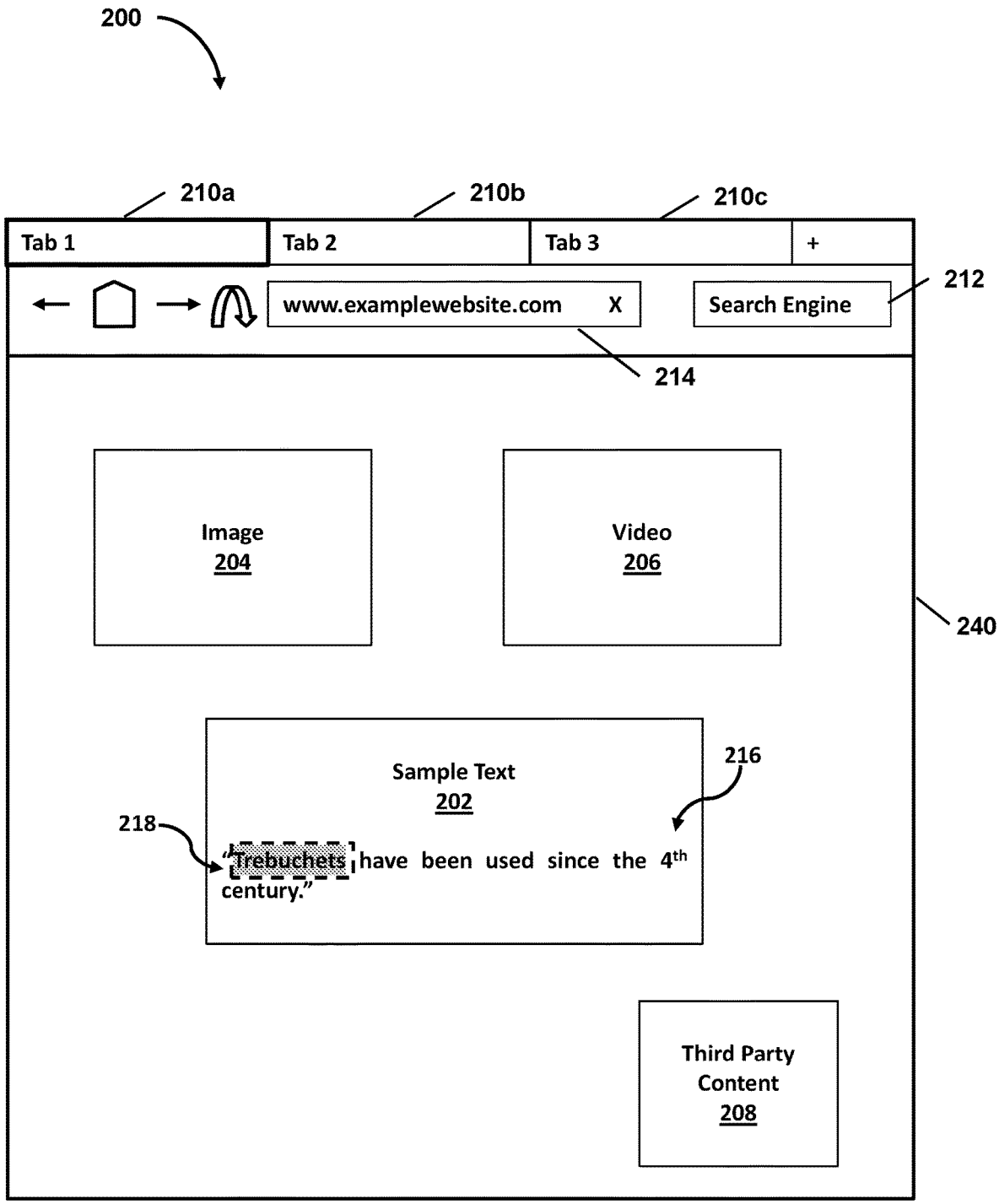
Figure 2C:
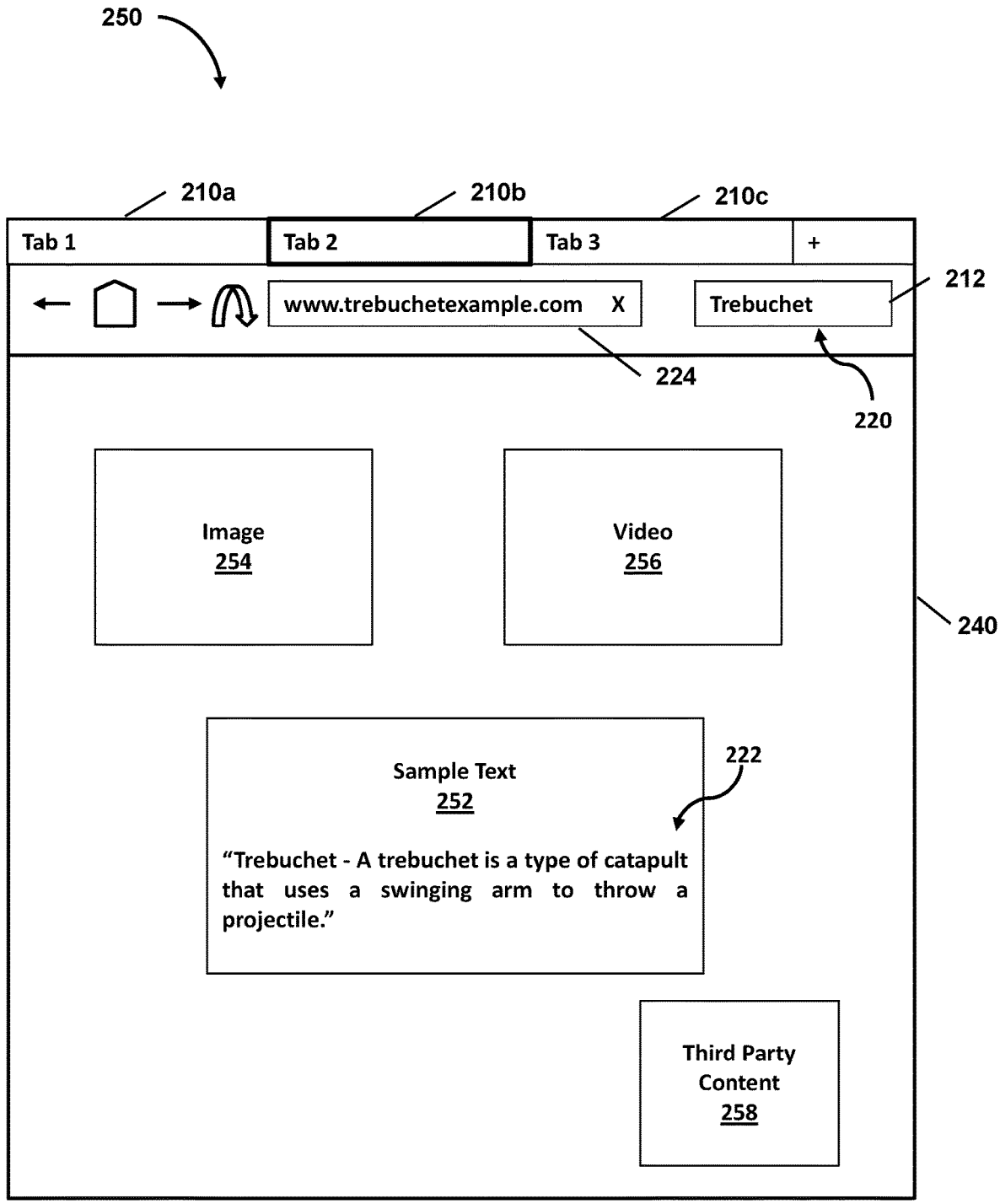

As an example, with reference to FIGS. 2A-2C, web browser 240 may render a website 200. In some embodiments, web browser 240 may be configured to operate on client device 104. A user may input, into a text box 214, a string of characters representing a URL or other reference identifier in order to access a website. For example, the user may input the URL "www.examplewebsite.com" into text box 214. In response to invoking the string of characters, web browser 240 may access the URL to retrieve a web document for website 200 and cause information representative of website 200 to be displayed. In some embodiments, the information displayed for website 200 may include various content items, such as text item 202, image item 204, and video item 206. A single instance of text item 202, image item 204, and video item 206 is included within website 200 for illustrative purposes, as website 200 may include multiple content items having any combination of text, image, and/or video. Furthermore, in some embodiments, website 200 may be configured to present one or more third party content items, such as third party content item 208. Third party content item 208 may be an advertisement or other content that is included within the display of website 200 and provided by an entity differing from an entity that hosts website 200.

In some embodiments, sample text item 202 may include one or more n-grams, words, or phrases. For example, sample text item 202 may include sentence 216: "Trebuchets have been used since the $4^{th}$ century." In some embodiments, a user may select one or more of the n-grams, words, or phrases via a corresponding client device 104. In response to a user selecting the word "trebuchets" from sentence 216, web browser 240 may be configured to visually highlight the word "trebuchets" as illustrated by dashed box 218. By selecting text (e.g., "trebuchets"), the user may indicate that he/she has a certain level of interest in the corresponding text. For instance, the user may select the text because the user seeks to learn more information about a particular topic, and the selected text is related to the topic. Alternatively or additionally, the user may select the text because the user may be interested in purchasing an item related to the text.

In some embodiments, the selected text may be copied to a buffer of client device 104. To copy the selected text, a user may select an option to copy an item via their cursor controlled by a computer mouse, via a finger or computer stylus, or via a keystroke command input by a computer keyboard. Some embodiments may include providing the copied text as an input to a search engine in order to perform a search. The selected text, as indicated by dashed box 218, may be provided as an input to a text box 212 of web browser 240 whereby a user may perform a search. In some embodiments, a user may access a search engine using a separate instance of web browser 240, such as a new tab, whereby the selected text may be provided as an input for a search. In some embodiments, web browser 240 may include a number of "tabs," such as tabs 210a-210c. Each tab may correspond to a separate instance of web browser 240. Each instance of web browser 240 may operate independently of the others, or may operate based on actions performed by the user in the other instances. In some embodiments, after selecting and copying the text displayed by a first tab 210a of web browser 240, the user may access a second tab 210b of web browser 240. In some embodiments, the selected text may be provided as an input 220 to text box 212 for performing a search via a search engine.

The search engine may perform a search using the selected text as an input. In some embodiments, the search engine may parse and tokenize each search term for querying a search index. The search engine may identify web documents related to the search terms, and may generate a search result page including search results. As an example, the search results may be displayed by the search result page in an order determined based on how relevant each search result is to the search terms, the user, prior searches performed by the user or a similar user, or other criteria. The search result page may be provided to client device 104 and rendered in web browser 240, (e.g., second tab 210b), such that the user is able to view and select one or more of the search results. In some embodiments, the search results may include URLs of a corresponding website associated with each search result, a summarization of the content included by each search result, one or more related websites (e.g., related to a respective search result's website), images and/or videos that is capable of being viewed upon accessing one of the search result websites, and the like.

In some embodiments, a user may access a website 250 associated with a search result by selecting, (e.g., clicking, tapping, etc.), on a hyperlink included within that search result. For instance, upon selecting one of the search results, the user may be directed to website 250, (e.g., having a URL 224: "www.trebuchetexample.com"). The web document for website 250 may be provided to client device 104, and web browser 240 may render website 250. In some embodiments, website 250 may include one or more content items, such as text item 252, image item 254, video item 256, and third party content item 258, which may be similar to text item 202, image item 204, video item 206, and third party content item 208 described above. For example, text item 252 may include a sentence 222: "Trebuchet—A trebuchet is a type of catapult that uses a swinging arm to throw a projectile." In this example, sentence 222 is related to the selected text from sentence 216 of website 200.

In some embodiments, web browser 240 may cause client device 104 to track and store data including each user interaction with web browser 240. The data may be provided to computer system 102, (e.g., to data collection subsystem 112), periodically. For example, the data may be provided to data collection subsystem 112 automatically, (e.g., daily, weekly, bi-weekly), in response to a request from data collection subsystem 112, or in response to an input detected by client device 104 to provide the data to data collection subsystem 112. As mentioned previously, data collection subsystem 112 may provide the data to user data database 134, whereby the data may be stored. In some embodiments, the data may include an indication of a user with which the user interactions correspond, a website, (e.g., a URL, initially accessed by the user via client device 104), text or other content selected by the user while the website is rendered on web browser 240, an indication that the text or other content was copied to a short-term memory buffer, an indication that another instance of web browser 240 was invoked, a website accessed by the user via web browser 240 after the selected text or other content was copied, an indication that the selected text or other content was provided as an input to a search engine and whether a search was performed, and a website, (e.g., URL 224), subsequently accessed by the user in response to the user selecting one of the search results determined by the search engine in response to performing the search. In some embodiments, the data stored by user data database 134 may be organized by user identifier, and may include the websites accessed initially and subsequently by a corresponding user, timestamps when the websites were accessed, content that was selected, and the like.

Data aggregation subsystem 114 may be configured to aggregate data stored by user data database 134. In some embodiments, data aggregation subsystem 114 may identify similar content selected by users when accessing a first website, subsequent actions performed by users upon selecting the text, and a second website or websites subsequently accessed by those users after the text was selected from the first website. Data aggregation subsystem 114 may retrieve data including user interactions with a website from user data database 134. In some embodiments, the data may be retrieved by data aggregation subsystem 114 in response to a request obtained by computer system 102 from client device 104. For example, a request for a hyperlink to be embedded into content on a website may be obtained by data aggregation subsystem 114 in response to a user operating client device 104 accessing the website via a web browser.

In some embodiments, data aggregation subsystem 114 may periodically aggregate user interaction data associated with different websites.

Figure 3A:
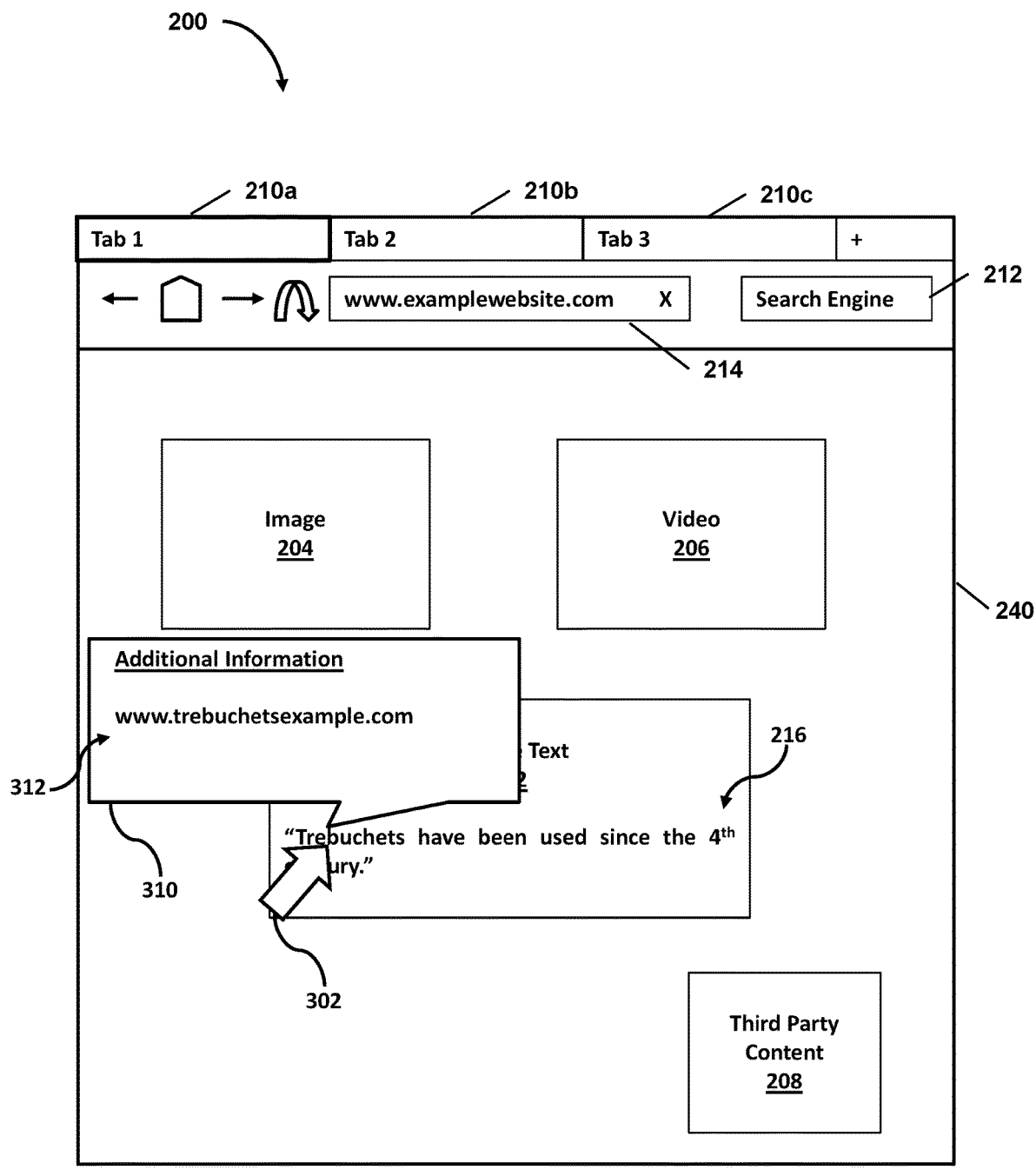
FIGS. 3A and 3B show a webpage including embedded content, in accordance with one or more embodiments.
Figure 3B:
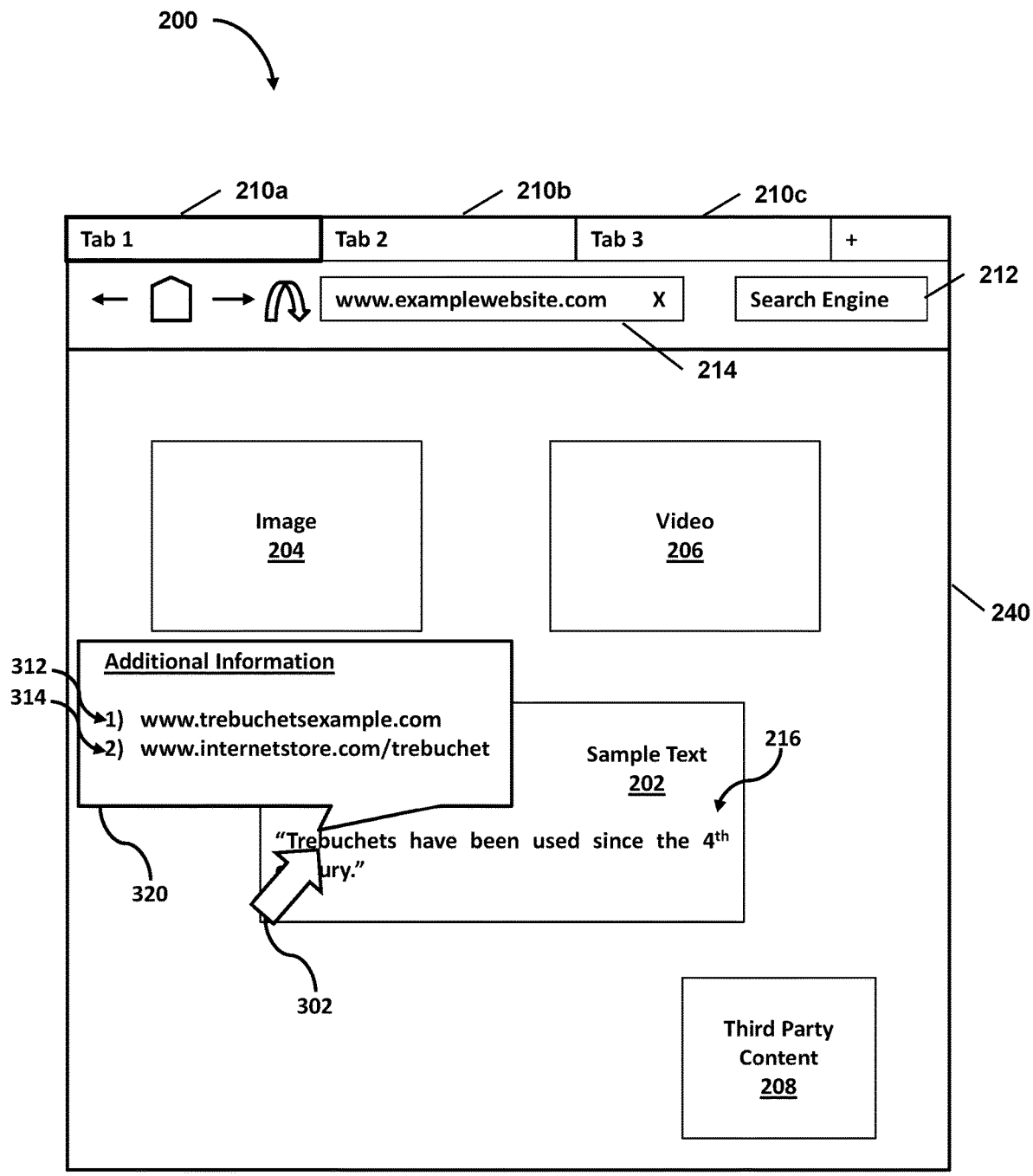

As an example, with reference to FIGS. 3A and 3B, a request for a hyperlink to be embedded into content on website 200 may be submitted to computer system 102 by web browser 240 operating on client device 104. In some embodiments, upon website 200 being rendered by web browser 240, (e.g., within tab 210*a*), client device 104 may provide a request to computer system 102, where the request is for a hyperlink to be embedded within website 200. In some embodiments, the request may be for a hyperlink to be embedded into content on website 200.

Content generation subsystem 116 may be configured to receive the request from client device 104 and determine, based on the request, a corresponding user with whom the request is associated, as well as, or alternatively, a website being accessed by web browser 240 of client device 104. In some embodiments, content generation subsystem 116 may extract, from the request, identification information, such as a user identifier (e.g., a username, email address, etc.), a device identifier (e.g., a MAC address of client device 104, an IP address associated with client device 104, a serial number associated with client device 104), temporal information such as a time that the request was received, an indication of a website currently being accessed by web browser 240 on client device 104, or a combination thereof. Furthermore, content generation subsystem 116 may be configured to extract additional information from the request, such as a device type, a browser type, an operating system of client device 104, display configuration information for client device 104, location information (e.g., a GPS location of client device 104), and the like.

After extracting the identification information from the request, content generation subsystem 116 may retrieve user interaction data to be used for generating hyperlinks to be embedded into website 200. For instance, content generation subsystem 116 may instruct data aggregation subsystem 114 to retrieve data including prior user interactions performed by users accessing website 200. In some embodiments, data aggregation subsystem 114 may determine the users may, for example, include the user that is currently accessing website 200, that previously accessed website 200. Data aggregation subsystem 114 may further determine websites subsequently accessed by those users, (e.g., website 250), after accessing website 200. In some embodiments, the users may include other users determined to be similar to the user currently accessing website 200. For example, as described below, similarity detection subsystem 118 may be configured to identify other users that have similar characteristics, search histories, and the like with respect to the user currently accessing website 200. As another example, similarity detection subsystem 118 may determine, based on the retrieved data, user interactions performed by users while accessing a different website that is similar to website 200 or includes content having a similar topic or topics as the content included within website 200. In some embodiments, data aggregation subsystem 114 may be configured to aggregate the user interaction data, whether it be data including prior user interactions of a user currently accessing website 200, prior user interactions of other users with website 200, or prior user interactions of the user and/or the other users with websites similar to website 200, and may provide the aggregated user interaction data to content generation subsystem 116.

Content generation subsystem 116 may determine and generate content to be embedded into a website based on retrieved user interaction data. Content generation subsystem 116 may analyze the aggregated user interaction data to identify websites related to website 200 (e.g., the website currently being viewed on web browser 240). In some embodiments, the user interaction data may indicate websites that were subsequently accessed after website 200 was accessed. For example, after a user accessed website 200, the user may have selected text, as indicated by dashed box 218, copied the selected text, provided the selected text as an input to a search engine, received search results in response to a search performed by the search engine, and accessed website 250 by selecting one of the search results. Therefore, content generation subsystem 116 may determine that website 250 is related to website 200. Furthermore, content generation subsystem 116 may determine that website 250 is related to the selected text, (e.g., "trebuchet,") included within sentence 216 on website 200.

In some embodiments, content generation subsystem 116 may determine, from the aggregated user interaction data, which website or websites are related to a website currently being accessed by a user. For example, content generation subsystem 116 may identify each website that was accessed by a user after that user accessed a first website. Content generation subsystem 116 may generate a ranking of the websites based on a number of users that visited each of the websites after visiting the first website. If the number of users that visited a second website after visiting the first website is equal to or greater than a threshold number of users, then the second website may be classified as being related to the first website. Some embodiments may include content generation subsystem 116 determining which website or websites were accessed after selecting the same or similar text (or other content) from the first website. For instance, the user interaction data may indicate which other users also selected the text "trebuchet" from website 200, copied the selected text, provided the select text as an input to a search engine to perform a search, and accessed second website 250 by selecting one of the results from the search. If the number of users that accessed second website 250 in response to the search based on the selected text is equal to or greater than a threshold number of users, then second website 250 may also be classified as being related to first website 250, and in particular that the selected text of first website 200 is related to second website 250.

In some embodiments, content generation subsystem 116 may generate a reference identifier, such as a hyperlink, to the second website and may provide the reference identifier to web browser 240 in response to the request. Each reference identifier may indicate one or more related websites, related content, or both, to be embedded into the content of website 200. In some embodiments, the reference identifier may indicate the selected text with which the reference identifier is to be embedded into. The reference identifiers and the corresponding websites with which they may be embedded into may be stored by content database 136. In some embodiments, content database 136 may include a listing of websites accessed by users based on the user interaction data, and one or more hyperlinks or other content related to each of the websites. In this way, if a request is received from a user while accessing a given website, content generation subsystem 116 may provide the reference identifiers associated with that website to client device 104 so that one or more of the reference identifiers may be embedded into the website's content.

As an example with reference to FIG. 3A, web browser 240 may embed a reference identifier, such as hyperlink 312, into the selected text. In response to the user moving a cursor 302 to hover over the selected text, or otherwise interact with the selected text, web browser 240 may cause a display window 310 to be displayed, where display window 310 includes hyperlink 312 directed to related website 250. In some embodiments, display window 310 may be a "pop-up" window. For example, in response to determining that a user interacts with the selected text, display window 310 may be displayed within web browser 240. In some embodiments, web browser 240 may include computer program code or may be provided with computer program code that causes a user interface to be embedded into the text. For example, in response to determining that the user interacts with the selected text, a user interface—such as display window 310—may be displayed. As another example, web browser 240 may display a user interface including display window 310. In some embodiments, multiple reference identifiers may be embedded into the content of website 200. For example, hyperlinks for each of the top-N websites determined to be related to website 200 may be embedded into the selected text. As an example, with reference to FIG. 3B, if the user moves cursor 302 to hover over the selected text, or otherwise interact with the selected text, web browser 240 may cause display window 320 to be displayed, where a display window 320 includes hyperlinks 312 and 314 directed to related website 250 and another related website.

In some embodiments, a determination of whether a hyperlink should be embedded into the selected text may be based on a number of users that also selected the same text and subsequently accessed the same website afterword. For example, a user may select the text "trebuchet" from sentence 216 of website 200, copy the selected text, perform a search using the selected text, and access website 250 based on results of the search. If a number of additional users that also, upon visiting website 200, select the same text and subsequently access website 250 equals or exceeds a threshold number of users, (e.g., 5 users, 10 users, 100 users, etc.), then website 250 may be classified as being related to website 200. In some embodiments, the next time the user visits website 200, a hyperlink directed to website 250, such as hyperlink 312, may be embedded into the selected text such that when the user interacts with the selected text, display window 320 including hyperlink 312 is displayed.

In some embodiments, content may be displayed within display window 320 instead of, or in addition to, hyperlinks directed to the corresponding related websites. For example, content generation subsystem 116 may retrieve the content from each related website prior to generating the hyperlinks for embedding. A summarization model may be used to generate content summaries of the related web site's content, which may then be provided in response to the request for a hyperlink. In some embodiments, content generation subsystem 116 may extract images, videos, text, or other information from the related websites and may provide the extracted content in response to the request for the hyperlink. In some embodiments, the generated content, (e.g., hyperlinks), may be stored in content database 136. Therefore, upon receipt of the request for embedding hyperlinks into a web page, content generation subsystem 116 may retrieve the hyperlinks from content database 136 and provide the hyperlinks to the request client device 104.

Similarity detection subsystem 118 may be configured to determine one or more users that are similar to a user that submitted a request for a hyperlink to be embedded in a website. In some embodiments, the request may include user identification information related to the user currently accessing website 200. The user identification information may indicate the user, and similarity detection subsystem 118 may retrieve a user profile associated with the user from profile database 138. The user profile may include information associated with the user, which may be explicitly provided by the user or implicitly determined based on the user's interactions with websites. For example, the user may provide a name, a username, an email address, etc., and this may be stored in profile database 138 as being associated with the user's profile. As another example, data aggregation subsystem 114 may be configured to extract information about the user from the user interaction data, such as commonly accessed websites, location information of the user, and the like, which may be stored in profile database 138 as being associated with the user's profile.

In some embodiments, when a request is received from the user's client device 104 to embed a hyperlink (or other content) into a currently accessed website, (e.g., website 200), similarity detection subsystem 118 may obtain user identification information extracted from the request by content generation subsystem 116. Similarity detection subsystem 118 may retrieve a user profile corresponding to the user identified from the user identification information and may determine one or more other user profiles that are similar to the retrieved user profile. For example, similarity detection subsystem 118 may determine topics of interest of the user based on the user profile. The topics of interest may be determined by analyzing the user's interactions with various websites. Similarity detection subsystem 118 may identify other user profiles that also have some or all of the same topics of interests of the user. If another user's profile is determined to have a threshold number of similarities, such a threshold number of similar topics of interests, then that user profile may be classified as being similar to the user profile of the user that is associated with the request. In some embodiments, similarity detection subsystem 118 may cause content generation subsystem 116 to retrieve user interaction data of the similar user. Content generation subsystem 116 may determine content to be embedded into the website currently being accessed by the user, (e.g., website 200), based on the similar user's prior interactions with the website or with other websites related to the similar topics of the user. In some embodiments, the content, (e.g., hyperlinks), directed to related websites may be generated and provided to client device 104 so as to be embedded into the currently accessed website.

In some embodiments, similarity detection subsystem 118 may determine websites that are similar to the user's currently accessed website, (e.g., website 200), and the website or websites subsequently accessed by the user. For example, similarity detection subsystem 118 may retrieve content included by an initially accessed website 200 and content included by a subsequently accessed website 250, and may determine topics associated with the content of both websites. Similarity detection subsystem 118 may be configured to generate a website profile for each website and store the website profiles in profile database 138. In response to receiving a request to embed a hyperlink or other content into a webpage, similarity detection subsystem 118 may identify, from the request, the website currently being accessed, and may determine other websites that are similar to that website. Similarity detection subsystem 118 may then indicate the similar websites to content generation subsystem 116, which may be configured to generate hyperlinks to the similar websites and provide the generated hyperlinks to the client device that the request was received so as to be embedded in the website's content.

In some embodiments, content generation subsystem 116 may train a prediction model, such as a machine learning model, to determine which hyperlinks should be embedded into a website based on prior user interactions with the website, prior interactions of other users identified as being similar to a user accessing a website, and/or similar websites to the website currently being accessed by the user. The prediction model may be trained using training data including the initially accessed websites, the selected text from the initially accessed websites, and the subsequently accessed websites. The prediction model may then be trained using the training data to identify, based on a given website being accessed by a user as indicated by a request for hyperlinks to be embedded into the given website's content, which additional websites hyperlinks are to be generated for and/or caused to be embedded into the web site's content.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, a machine learning model may take inputs and provide outputs (e.g., websites with which hyperlinks are to be generated for and/or caused to be embedded into a currently accessed website). For example, the inputs may include the initially accessed websites, the selected text, the subsequently accessed websites, and user profile information (e.g., a location of a user or device associated with the user, an age of the user, or one or more implied or declared interests/preferences of the user). In some embodiments, the outputs may be fed back to the machine learning model as input to train the machine learning model (e.g., alone or in conjunction with user indications of the accuracy of the outputs, labels associated with the inputs, or with other reference feedback information). In some embodiments, the machine learning model may update its configurations (e.g., weights, biases, or other parameters) based on its assessment of its prediction (e.g., the outputs) and reference feedback information (e.g., user indication of accuracy, reference labels, or other information). In some embodiments, where the machine learning model is a neural network, connection weights may be adjusted to reconcile differences between the neural network's prediction and the reference feedback. Some embodiments include one or more neurons (or nodes) of the neural network requiring that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model may be trained to generate better predictions.

Example Flowcharts

Figure 4:
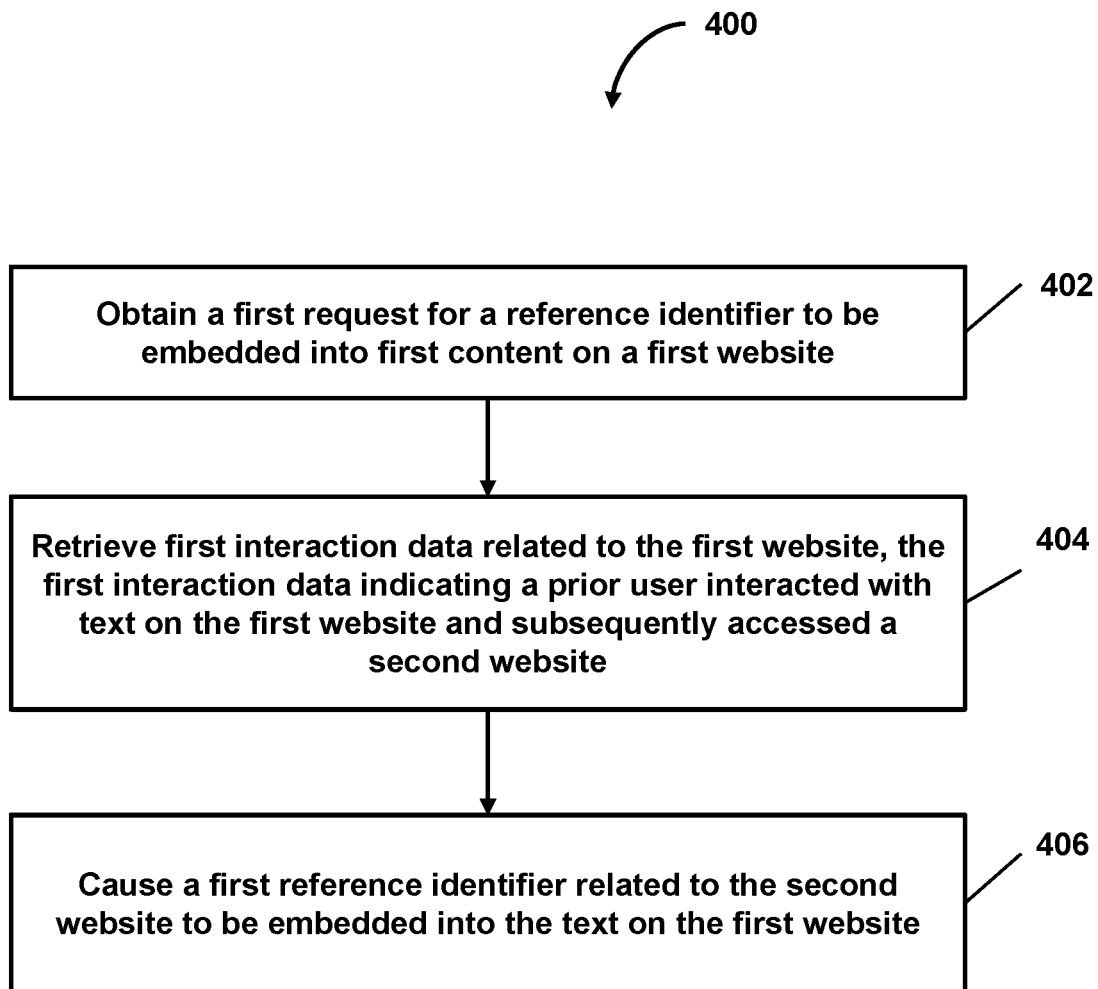
FIG. 4 shows a flowchart of a method for embedding content into a webpage, in accordance with one or more embodiments.
Figure 5:
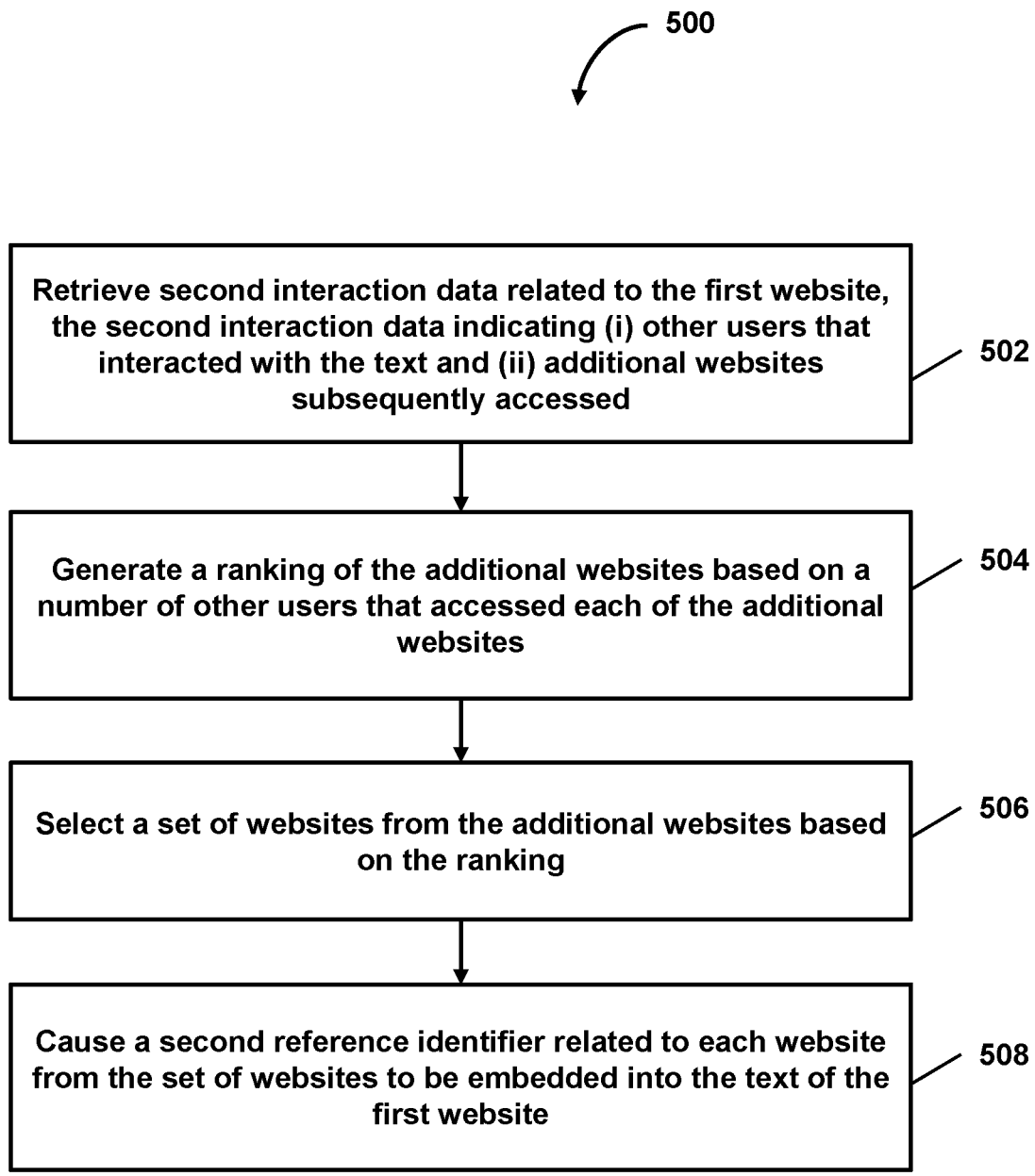
FIG. 5 shows a flowchart of a method of determining content to be embedded into a webpage based on user interactions, in accordance with one or more embodiments.
Figure 6:
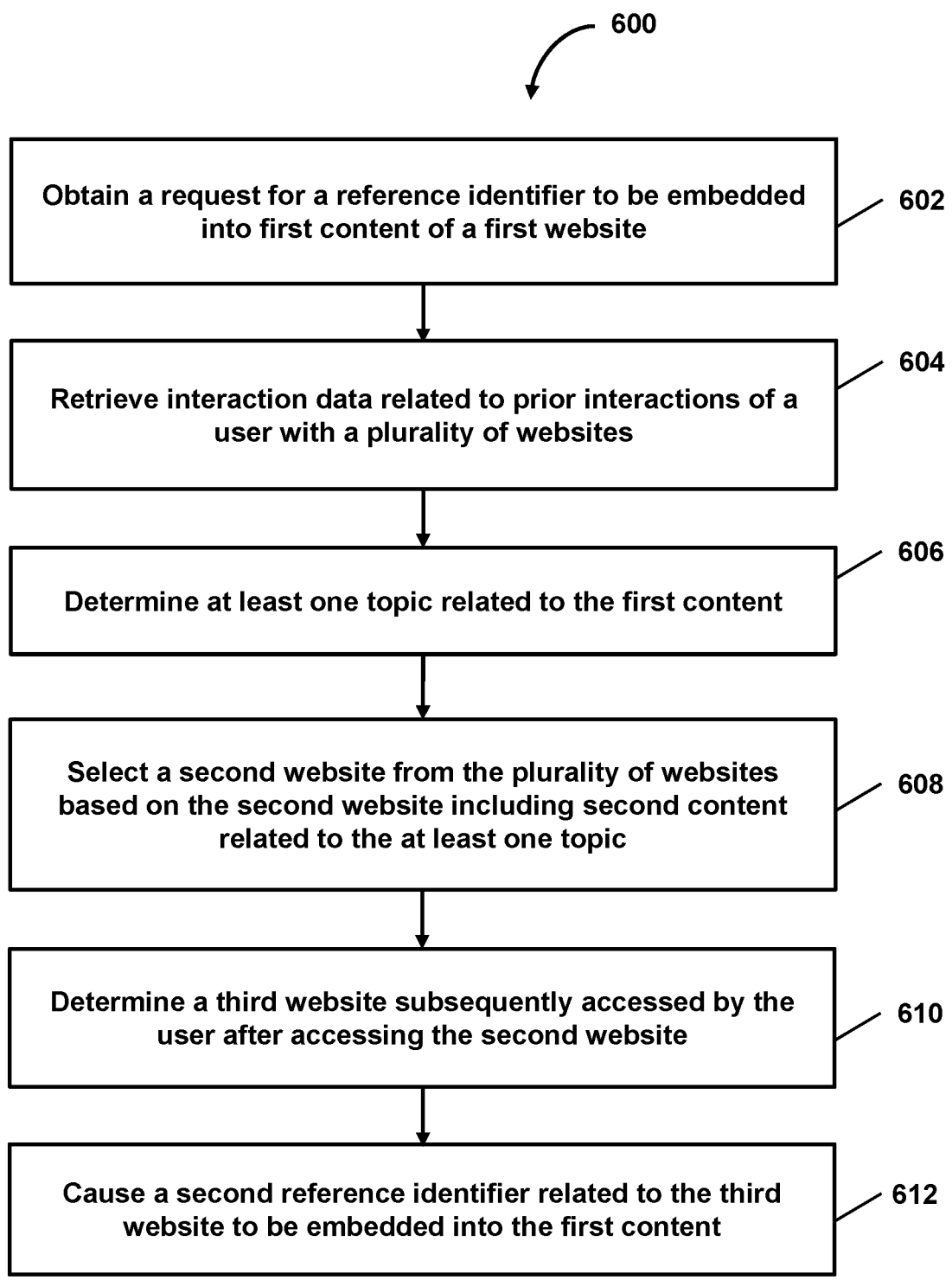
FIG. 6 shows a flowchart of another method for determining content to be embedded into a webpage based on a topic of the webpage, in accordance with one or more embodiments.

FIGS. 4-6 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 for embedding content into a webpage, in accordance with one or more embodiments. In an operation 402, a first request for a reference identifier to be embedded into first content on a first website may be obtained. In some embodiments, the request may be obtained in response to a user accessing a website. For example, in response to a user accessing website 200 using web browser 240 operating on client device 104, a request for one or more hyperlinks to be embedded into website 200 may be sent from client device 104 to computer system 102. In some embodiments, the reference identifiers may include hyperlinks, other content (e.g., summarizations of information rendered by a website, images and/or videos from the website), or both. In some embodiments, the request may include identification information such as user identification information. For example, the user identification information may include a username, a user's email, a device identifier, etc. In some embodiments, the reference identifiers are to be embedded into content on the website accessed by the user. For instance, the reference identifiers are to be embedded at a location or locations of a particular word, phrase, image, etc. In some embodiments, operation 402 may be performed by a subsystem that is the same or similar to data aggregation subsystem 114 or content generation subsystem 116.

In operation 404, first interaction data related to the first website may be retrieved. The first interaction data may indicate a prior user interacted with text on the first website and subsequently accessed a second website. For example, the first interaction data may indicate that a user who previously accessed website 200, selected text from the content of website 200, provided the selected text as an input to a search, and accessed a website, (e.g., website 250), by selecting one of the search results responsive to the search. The first interaction data may further indicate that the user accessed a new instance of web browser 240 after selecting the text, where the new instance of web browser 240 is used to access a search engine for performing the search. In some embodiments, the first interaction data may indicate each website subsequently accessed by users that accessed a first website, (e.g., website 200). In some embodiments, operation 404 may be performed by a subsystem that is the same or similar to data aggregation subsystem 114 or content generation subsystem 116.

In operation 406, a first reference identifier related to the second website may be caused to be embedded into the text on the first website. For example, hyperlink 312 directed to website 250 may be provided to web browser 240 such that hyperlink 312 is embedded into text item 202 on website 200. The first reference identifier may include a hyperlink directing users to the second website in response to selecting the hyperlink. In some embodiments, the first reference identifier may be generated and provided to a web browser, (e.g., web browser 240), for being embedded into the text. The first reference identifier may be generated and caused to be embedded into the text of the first website based on a determination that the second website includes second content related to the selected text, that the prior user interacted with the text on the first website, and that the prior user accessed the second website after interacting with the first content on the first website. In some embodiments, the prior user and the user currently accessing the first website, (e.g., website 200), are the same user. In some embodiments, the prior user and the user currently accessing the first website may be different users. For example, the prior user that accessed website 200 and selected the highlighted text (e.g., "trebuchet") and the user currently accessing website 200 and selecting the text "trebuchet" are similar to one another, and therefore the web site subsequently accessed by the prior user may also be of interest to the user. In some embodiments, operation 406 may be performed by a subsystem that is the same or similar to data aggregation subsystem 114 or content generation subsystem 116.

In some embodiments, in response to web browser 240 of client device 104 or computer system 102 determining that the user currently accessing website 200 selects the text, the reference identifier related to website 250 may be provided to the user. For example, display window 320 may be presented within web browser 240 in response to determining that a user has moved cursor 302 over the text "trebuchet" within text item 202.

FIG. 5 shows a flowchart of a method 500 of determining content to be embedded into a webpage based on user interactions, in accordance with one or more embodiments. In some embodiments, method 500 may be performed subsequent to the operations of method 400. However, alternatively, method 500 may be performed independent of method 400 or prior to the operations of method 400. In an operation 502, second interaction data related to the first website may be retrieved. The second interaction data may indicate other users that interacted with the selected text, (e.g., "trebuchet" within sentence 216), and one or more additional websites subsequently accessed by the other users after selecting the text. In some embodiments, the second interaction data may be retrieved based on a request from web browser 240 for reference identifiers to be embedded into a first website currently being accessed by a user. For example, the second interaction data may be retrieved in response to the first request for reference identifiers to be embedded into website 200. In some embodiments, operation 502 may be performed by a subsystem that is the same or similar to data aggregation subsystem 114.

In an operation 504, a ranking of the additional websites may be generated based on a number of other users that accessed each of the additional websites. In some embodiments, the ranking may be generated based on the second interaction data. For instance, for each website accessed by a user, user data database 134 may store records indicating the subsequent websites accessed, if any, by the user. The number of users that accessed each of the websites may be determined and used to generate the ranking of the websites. In some embodiments, operation 504 may be performed by a subsystem that is the same or similar to data aggregation subsystem 114.

In an operation 506, a set of websites from the additional websites may be selected based on the ranking. In some embodiments, the set of websites may include a top-N ranked websites from the ranking of the additional websites. The top-N ranked websites may be a top ranked website, top two ranked websites, top three ranked websites, etc. The top-N ranked websites may be personalized for each user or for a cluster of users (e.g., users of a same age range, users having a same interest/preference, users having similar geographical locations, etc.). In some embodiments, the set of websites may include the second website and at least one additional website. For example, the set of websites may include website 250 and at least one additional website (e.g., a website associated with hyperlink 314). In some embodiments, operation 506 may be performed by a subsystem that is the same or similar to data aggregation subsystem 114 or content generation subsystem 116.

In an operation 508, a second reference identifier related to each website from the set of websites may be caused to be embedded into the text of the first website. For example, hyperlinks 312 and 314 may be generated and embedded into the text of website 200. In some embodiments, the second reference identifier related to each website may be generated. For instance, hyperlinks directed to each website, (e.g., including a user-selectable URL), may be generated and provided to browser 240. Alternatively or additionally, the hyperlinks may be retrieved from content database 136 if the hyperlinks were already generated. In response to the user accessing the first website and interacting with the text, the first reference identifier related to the second website and the second reference identifier related to each of the at least one of the plurality of additional websites may be displayed. For example, upon a user interacting with the word "trebuchet" within text item 202 of website 200, display window 320 including hyperlinks 312 and 314 may be displayed. In some embodiments, operation 506 may be performed by a subsystem that is the same or similar to content generation subsystem 116.

FIG. 6 shows a flowchart of another method 600 for determining content to be embedded into a webpage based on a topic of the webpage, in accordance with one or more embodiments. In an operation 602, a request for a reference identifier to be embedded into first content of a first website may be obtained. For example, web browser 240 may generate and send a request to computer system 102 for a hyperlink (or hyperlinks) to be embedded into a content item included within website 200. In some embodiments, the request may be sent prior to a user accessing website 200. Alternatively, the request may be sent upon web browser 240 determining that a website, such as website 200, has been accessed. In some embodiments, operation 602 may be performed by a subsystem that is the same or similar to data aggregation subsystem 114 or content generation subsystem 116.

In an operation 604, interaction data related to prior interactions of a user with a plurality of websites may be retrieved. The interaction data may be retrieved from user data database 134, which may store the interaction data in one or more data structures organized for each user. A particular user with whom the request is associated may be determined based on information extracted from the request, such as a user identifier, device identifier, and the like. Based on the request, and in particular the extracted information, the user associated with the request may be identified, the location of the user's data in user data database 134 may be determined, and the user's interaction data may be retrieved. The interaction data may indicate websites that the particular user previously accessed. The interaction data may also indicate actions performed by the user while accessing those websites, as well as any additional websites subsequently accessed by the user after the actions were performed. For example, the interaction data may indicate that a user accessed a first website, selected and copied text from the first website, accessed a search engine and performed a search using the selected text as an input, and accessed a second website corresponding to one of the search's results. The plurality of websites may be each of the websites with which the user accessed subsequent to accessing the first website. In some embodiments, operation 604 may be performed by a subsystem that is the same or similar to data aggregation subsystem 114.

In an operation 606, at least one topic related to the first content may be determined. The first content of the initially accessed website, (e.g., website 200), may include one or more content items. In some embodiments, the content items may be analyzed to determine what each content item is related to. For example, text item 202 may be analyzed using a natural language understanding (NLU) model to determine words and/or phrases included within text of text item 202. Based on the words and/or phrases, the NLU model may identify concepts related to those words and/or phrases. As another example, image item 204 may include an image of an object. Image item 204 may be analyzed using an object recognition computer vision model to determine the object included within the image, and a topic associated with the object may be determined by the object recognition computer vision model. In some embodiments, the object recognition computer vision model may be a convolutional neural network (CNN), a deep convolutional neural network (DNN), or other neural network, and may include a number of layers, (e.g., three or more layers). The determined topics may be stored in profile database 138 as being associated with a profile for the website. For example, a website profile for website 200 may include information indicating the determined topics related to the content of website 200. In some embodiments, operation 606 may be performed by a subsystem that is the same or similar to content generation subsystem 116 or similarity detection subsystem 118.

In an operation 608, a second website from the plurality of websites may be selected based on the second website including second content related to the at least one topic. In some embodiments, each of the websites subsequently accessed by the user after accessing the first website may be analyzed in a manner similar to the manner described above. For example, content from each of the subsequently accessed web sites may be retrieved and analyzed to identify one or more topics described by the content. In some embodiments, after the topic or topics associated with the currently accessed content is/are determined in response to the request, the topics may be compared to the topics of the subsequently accessed websites. For example, the interaction data may indicate the websites subsequently accessed after the first website was accessed, and website profiles for each website may be retrieved from profile database 138. The topics of the first website may then be compared to the topics of each subsequently accessed website using the profiles for those websites. In some embodiments, the second website selected from the subsequently accessed websites may be the website having a greatest similarity in topics as compared to the identified topics of the first website. The similarity may be computed by determining keyword matches between the topics of the first website and the subsequently accessed websites. For example, similarity scores may be determined by computing a similarity score between the website and each subsequently accessed website by extracting the words or phrases of the topics and determining feature similarities between the words or phrases of the topics. In some embodiments, a Word2Vec model or a Latent Semantic Analysis (LSA) model may be used to determine similar words or phrases between the words or phrases of the initially accessed website's topics and the words or phrases of each subsequently accessed website. For example, if the words or phrases are represented as feature vectors, a cosine distance or Minkowski distance may be computed in order to determine which topics, and therefore websites, are most similar to the topics of the initially accessed websites. In some embodiments, operation 608 may be performed by a subsystem that is the same or similar to content generation subsystem 116 or similarity detection subsystem 118.

In an operation 610, a third website subsequently accessed by the user after accessing the second website may be determined. In some embodiments, after the second website is selected, the user interaction data may be analyzed to determine which, if any, additional websites were accessed by the user after accessing the second website. In some embodiments, operation 610 may be performed by a subsystem that is the same or similar to content generation subsystem 116 or similarity detection subsystem 118.

In an operation 612, a second reference identifier related to the third website may be caused to be embedded into the first content. For instance, because the second website included content identified as being similar to the first website's content, and because the third website was subsequently accessed by the user after accessing the second website, the first website and the third website may be classified as being related. Therefore, a user, while accessing the first website, may benefit from being able to subsequently access the third website. In some embodiments, a hyperlink directing the user to the third website may be generated. The hyperlink may be stored in content database 136 in association with the first website, the second website, and the third website, such that if the user accesses any of the first, second, or third websites, the second reference identifier may be provided. In some embodiments, the second reference identifier may be embedded in the selected text of the first website, such as the selected text that was used to obtain the search result associated with the second website. In some embodiments, operation 612 may be performed by a subsystem that is the same or similar to content generation subsystem 116.

In some embodiments, the various computers and subsystems illustrated in FIG. 1 may include one or more computing devices that are programmed to perform the functions described herein. The computing devices may include one or more electronic storages (e.g., prediction database(s) 132, which may include user data database(s) 134, content database(s) 136, profile database(s) 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some, or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships, (e.g., "in response to X, Y," "upon X, Y," "if X, Y," "when X, Y,") and the like, encompass causal relationships in which the antecedent is a necessary causal condition, the antecedent is a sufficient causal condition, or the antecedent is a contributory causal condition of the consequent, (e.g., "state X occurs upon condition Y obtaining" is generic to "X occurs solely upon Y" and "X occurs upon Y and Z."). Such conditional relationships are not limited to consequences that instantly follow the antecedent obtaining, as some consequences may be delayed, and in conditional statements, antecedents are connected to their consequents, (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, (e.g., with explicit language like "after performing X, performing Y,") in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method comprising: obtaining a first request for a reference identifier to be embedded into first content on a first website, the first request being obtained based on a first user accessing the first website; retrieving, based on the first request, first interaction data related to the first website, the first interaction data indicating that a prior user interacted with text on the first website and subsequently accessed a second website; and causing a first reference identifier related to the second website to be embedded into the text on the first website based on: (i) the second website comprising second content related to the text, (ii) the prior user interacting with the text on the first website, and (iii) the prior user accessing the second website after interacting with the first content on the first website.

2. The method of embodiment 1, further comprising: determining, based on the first request, that the first user selected the text on the first website, wherein the first reference identifier is provided in response to the first user selecting the text.

3. The method of any of embodiments 1-2, wherein the prior user selecting the text comprises the prior user highlighting the text on the first website, the method further comprising: determining that the highlighted text was copied to a short-term memory buffer; determining that the copied text was provided as an input for a search; and determining that the second website was accessed in response to the prior user selecting a search result from the search.

4. The method of any one of embodiments 1-3, further comprising: retrieving, based on the first request, second interaction data related to the first website, wherein the second interaction data indicates (i) a plurality of other users that interacted with the text on the first website and (ii) a plurality of additional websites accessed by the plurality of other users subsequent to interacting with the text on the first website; and generating, based on the second interaction data, a ranking of the plurality of additional websites based on a number of other users that accessed each of the plurality of additional websites.

5. The method of embodiment 4, wherein the plurality of other users are determined to be similar to the first user, the method further comprises: obtaining a user profile of the first user; obtaining user profiles of other users; and determining plurality of other users based on the user profile and at least some of the user profiles of the other users having a similarity score equal to or greater than a threshold similarity, wherein the plurality of other users are selected from the other users based on the similarity score of a corresponding other user and the first user.

6. The method of embodiment 4, further comprising: selecting a set of websites from the plurality of additional websites based on the ranking, wherein the set of websites comprises the second website and at least one of the plurality of additional websites; causing a second reference identifier related to each of the at least one of the plurality of additional websites to be embedded into the text on the first website such that, in response to the first user accessing the first website and interacting with the text, the first reference identifier related to the second website and the second reference identifier related to each of the at least one of the plurality of additional websites are displayed.

7. The method of embodiment 6, wherein causing the first reference identifier related to the second website to be embedded into the text comprises: determining that the second website is a most frequented website of the plurality of websites based on the ranking; and selecting the second website based on the second website being the most frequented website.

8. The method of any one of embodiments 1-7, further comprising: obtaining a second request for a second reference identifier to be embedded into the first content on the first website, the second request being obtained based on the first user accessing the first website, and the second request being obtained subsequent to the first request being obtained; retrieving, based on the second request, second interaction data related to prior interactions of the first user with a plurality of websites; determining at least one topic related to the first content of the first website; selecting a third website from the plurality of websites based on the third website comprising third content related to the at least one topic; determining, based on the second interaction data, a fourth website subsequently accessed by the first user after accessing the third website; and causing a second reference identifier related to the fourth website to be embedded into the first content.

9. The method of embodiment 8, further comprising: retrieving a first website profile of the first website; retrieving a second website profile of each of the plurality of websites; extracting one or more topics of content of each of the plurality of websites from the second profile; determining a similarity between the at least one topic and the one or more topics, wherein the third website is selected based on the similarity between the at least one topic and the one or more topics satisfying a similarity condition.

10. The method of embodiment 9, wherein the similarity is determined using a Word2Vec model, a Latent Semantic Analysis (LSA) model, or the Word2Vec model and the LSA model; and wherein the similarity condition is satisfied for a cosine distance or a Minkowski distance between a feature vector of the at least one topic and a feature vector of the one or more topics being equal to or less than a threshold distance.

11. The method of any of embodiments 1-10, further comprising: retrieving second interaction data comprising a first plurality of websites accessed by the first user and a second plurality of websites subsequently accessed by the first user, wherein the first user accesses one of the second plurality of websites after accessing one of the first plurality of websites; generating training data for a machine learning model, the training data comprising the first interaction data and the second interaction data; and providing the training data as an input for the machine learning model, wherein the machine learning model is configured to identify one or more websites with which a corresponding reference identifier is to be embedded into the first content of the first website.

12. The method of embodiment 11, wherein the machine learning model comprises a convolutional neural network (CNN).

13. The method of any of embodiments 1-12, further comprising: obtaining a notification that the first user accessed a third website, wherein the notification comprises an indication of a uniform resource locator (URL) of the third website; retrieving third content on the third website; determining, based on the third content, that the third website comprises an instance of the text; and causing the first reference identifier related to the second website to be embedded into the text on the third website.

14. The method of embodiment 13, wherein the third website includes a plurality of instances of the text, the plurality of instances including the instance of the text.

15. The method of embodiment 14, wherein the first reference identifier is embedded at each of the plurality of instances of the text on the third website.

16. The method of any of embodiments 1-15, wherein the first content on the first website comprises one or more content items.

17. The method of embodiment 16, wherein the one or more content items comprise a text item, an image item, a video item, or a third party content item, wherein the text item includes one or more n-grams, words, or phrases, the image item includes one or more images of one or more objects, the video item includes one or more videos, and the third party content item includes one or more advertisements.

18. The method of embodiment 16, wherein the one or more content items includes a text item, wherein the text item includes at least one sentence formed of words, and the text on the first website comprises at least one of the words.

19. The method of any of embodiments 1-18, wherein the reference identifier comprises a hyperlink including a uniform resource location (URL) directed to the second website.

20. The method of any of embodiments 1-19, wherein the reference identifier comprises content related to the second website, wherein the content includes a summary of the second website, one or more images or videos accessible from the second website, or one or more related website URLs.

21. The method of any of embodiments 1-20, wherein the first user is the prior user.

22. The method of any of embodiments 1-21, wherein the first user differs from the prior user.

23. The method of embodiment 22, wherein a profile of the first user is determined to be similar to a profile of the prior user.

24. One or more tangible, non-transitory, machine-readable media storing instructions that, when executed by one or more processors, effectuation operations comprising those of any of embodiments 1-23.

25. A system comprising: one or more processors; and memory storing computer program instructions that, when executed by the one or more processors, cause the one or more processors to effectuate operations comprising those of any of embodiments 1-23.

What is claimed is:

1. A system for providing dynamic hyperlinks, the system comprising:
one or more processors programed with computer program instructions that, when executed, cause operations comprising:
in response to a user accessing a first website, obtaining a first request for a hyperlink to be embedded into text on the first website selected by the user;
in response to the first request, generating a first hyperlink directed to a second website based on prior interaction data indicating that a plurality of users similar to the user (i) selected text on the first website, (ii) subsequently used the selected text as an input for a search after selecting the text, and (iii) selected a search result comprising the second website; and
transmitting instructions to embed the first hyperlink into the selected text on the first website such that the first hyperlink is displayed on the first website during the access of the first website by the user in response to the user interacting with the selected text.

2. The system of claim 1, the operations further comprising:
determining additional websites (i) accessed by the plurality of users and (ii) corresponding to results of searches performed by the plurality of users in connection with selecting the text on the first website and subsequently providing the selected text as an input for a respective one of the searches; and
causing one or more additional hyperlinks to be embedded into the selected text on the first website based on a number of users of the plurality of users that respectively selected each of the results, wherein each of the one or more additional hyperlinks is directed to a corresponding URL of a corresponding one of the additional websites.

3. The system of claim 1, the operations further comprising:
determining a third website based on the third website comprising content related to at least one topic related to first content on the first website comprising the text; and
transmitting, based on a fourth website being accessed by the user after the user accessed the third website, instructions to embed a second hyperlink directed to a URL of the fourth website into the first content on the first website.

4. The system of claim 1, the operations further comprising:
in response to the user accessing a third website, causing the first hyperlink to be embedded into an instance of the selected text on the third website during the access of the third website by the user based on a determination that the third website comprises the instance of the selected text.

5. A method comprising:
in connection with a user accessing a first website, obtaining a first request for a hyperlink to be embedded into text on the first website selected by the user;
generating a first hyperlink directed to a second website based on (1) the first request and (2) prior interaction data, the prior interaction data indicating that a plurality of users similar to the user (i) interacted with the first website, (ii) subsequently used the selected text as an input for a search, and (iii) selected a search result comprising the second website; and
causing the first hyperlink to be embedded into the selected text on the first website such that the first hyperlink is displayed on the first website during the access of the first website by the user in response to the user interacting with the selected text.

6. The method of claim 5, further comprising:
determining that the user is interacting with the selected text during the access of the first website by the user,
wherein the first hyperlink is displayed by the first website based on the determination that the user is interacting with the selected text during the access of the first website by the user.

7. The method of claim 5, further comprising:
determining additional websites (i) accessed by the plurality of users and (ii) corresponding to results of searches performed by the plurality of users in connection with selecting the text on the first website and subsequently providing the selected text as an input for a respective one of the searches; and
causing one or more additional hyperlinks to be embedded into the selected text on the first website based on a number of users of the plurality of users that respectively selected each of the results, wherein each of the one or more additional hyperlinks is directed to a corresponding URL of a corresponding one of the additional websites.

8. The method of claim 5, further comprising:
determining a third website based on the third website comprising content related to at least one topic related to first content on the first website comprising the text;
determining a fourth website accessed by the user after the user accessed the third website; and
causing, based on the fourth website being accessed by the user after the user accessed the third website, a second hyperlink directed to a URL of the fourth website to be embedded into the first content on the first website.

9. The method of claim 5, further comprising:
in connection with the user accessing a third website, determining that the third website comprises an instance of the selected text; and
causing the first hyperlink to be embedded into the instance of the selected text on the third website during the access of the third website by the user.

10. The method of claim 5, wherein causing the first hyperlink to be embedded into the selected text on the first website comprises transmitting, to a browser application of the user, code for embedding the first hyperlink into the selected text for a rendering of the first website.

11. One or more non-transitory computer-readable media storing instructions that, when executed by one or more processors, cause operations comprising:
in connection with a user accessing a first website, obtaining a first request for a hyperlink to be embedded into text on the first website;
generating a first hyperlink directed to a second website based on (1) the first request and (2) prior interaction data, the prior interaction data indicating that a plurality of users similar to the user (1) interacted with the first website, (ii) subsequently used the text as an input for a search, and (iii) selected a search result comprising the second website; and
causing the first hyperlink to be embedded into the selected text on the first website such that the first hyperlink is displayed on the first website during the access of the first website by the user in response to the user interacting with the selected text.

12. The one or more non-transitory computer-readable media of claim 11, the operations further comprising:
- determining additional websites (i) accessed by the plurality of users and (ii) corresponding to results of searches performed by the plurality of users in connection with selecting the text on the first website and subsequently providing the selected text as an input for a respective one of the searches; and
- causing one or more additional hyperlinks to be embedded into the selected text on the first website based on a number of users of the plurality of users that respectively selected each of the results, wherein each of the one or more additional hyperlinks is directed to a corresponding URL of a corresponding one of the additional websites.

13. The one or more non-transitory computer-readable media of claim 11, the operations further comprising:
- determining a third website based on the third website comprising content related to at least one topic related to first content on the first website comprising the text;
- determining a fourth website accessed by the user after the user accessed the third website; and
- causing, based on the fourth website being accessed by the user after the user accessed the third website, a second hyperlink directed to a URL of the fourth website to be embedded into the first content on the first website.

14. The one or more non-transitory computer-readable media of claim 11, further comprising:
- in connection with the user accessing a third website, determining that the third website comprises an instance of the selected text; and
- causing the first hyperlink to be embedded into the instance of the selected text on the third website during the access of the third website by the user.

15. The one or more non-transitory computer-readable media of claim 11, wherein causing the first hyperlink to be embedded into the selected text on the first website comprises transmitting, to a browser application of the user, code for embedding the first hyperlink into the selected text for a rendering of the first website.

* * * * *